United States Patent [19]
Bristol

[11] Patent Number: 4,787,730
[45] Date of Patent: Nov. 29, 1988

[54] EYEGLASS ASSEMBLY

[76] Inventor: Alexander Bristol, 5840 SW. 85 St., Miami, Fla. 33143

[21] Appl. No.: 34,690

[22] Filed: Apr. 6, 1987

[51] Int. Cl.$^4$ ............................................. G02C 5/12
[52] U.S. Cl. .................................... 351/138; 351/80; 351/88
[58] Field of Search ............... 351/136, 138, 128, 95, 351/107, 131, 88, 80, 87, 108, 109

[56] References Cited

U.S. PATENT DOCUMENTS

| | | | |
|---|---|---|---|
| 2,432,676 | 12/1947 | Peck et al. | 351/227 |
| 2,482,664 | 9/1949 | Gagnon | 351/108 |
| 2,843,115 | 7/1958 | Aufricht | 351/128 |
| 4,405,214 | 9/1983 | Bolle | 351/138 |
| 4,445,760 | 5/1984 | Simms | 351/95 |

*Primary Examiner*—Rodney B. Bovernick
*Assistant Examiner*—P. M. Dzierzynski
*Attorney, Agent, or Firm*—Gifford, Groh, Sheridan, Sprinkle and Dolgorukov

[57] ABSTRACT

An eyeglass assembly having a left frame part, a right frame part and a nosepiece which joins the left and right frame parts together and is adapted to rest on the bridge of a nose. A saddle detachably secures the nosepiece to the frame parts and, in doing so, simultaneously locks the left and right lenses to the eyeglass assembly. In addition, the nosepiece is preferably constructed with varying lateral widths and vertical heights in order to accommodate different pupillary distances and pupillary vertical orientations for different persons.

5 Claims, 1 Drawing Sheet

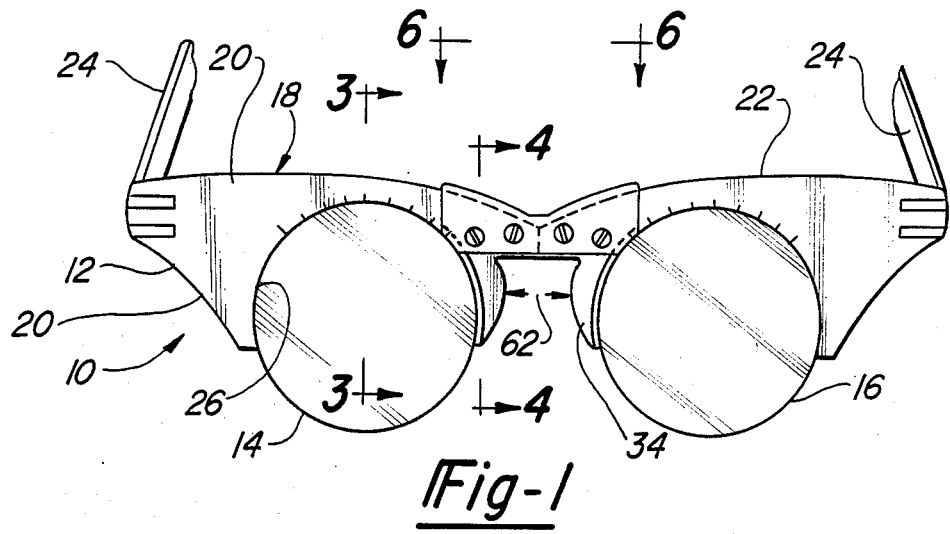
Fig-1
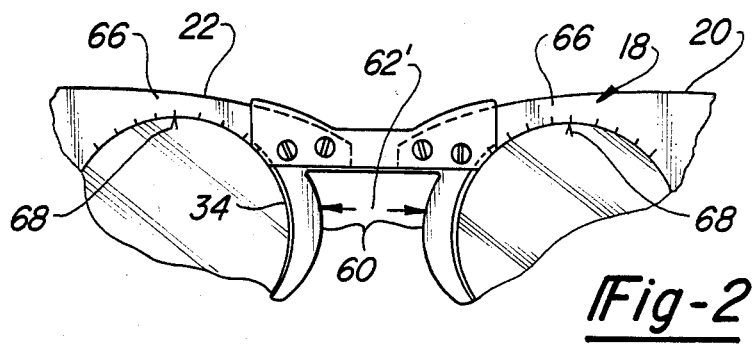
Fig-2
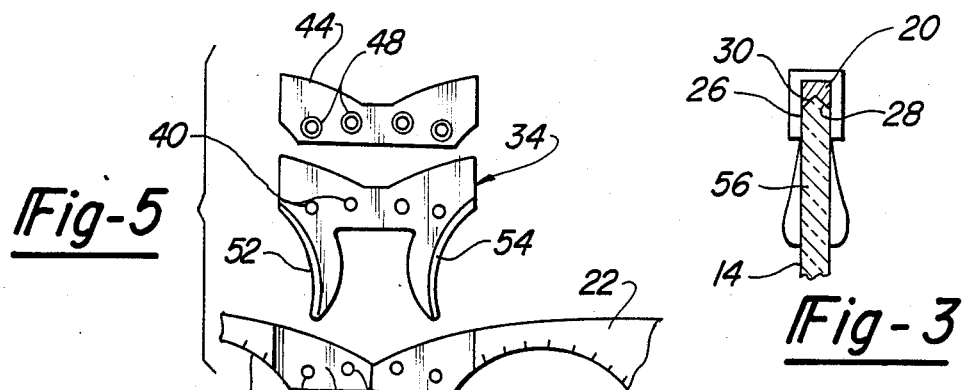
Fig-5    Fig-3
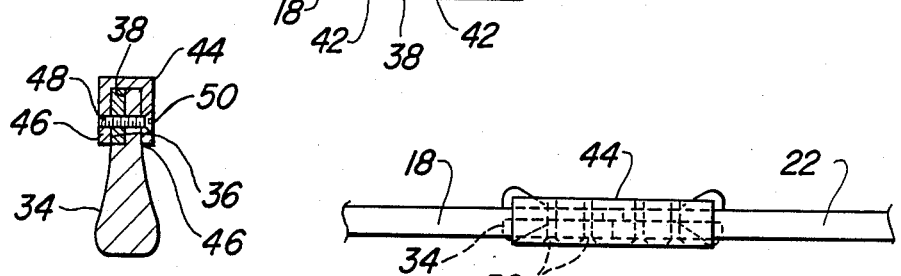
Fig-4    Fig-6

EYEGLASS ASSEMBLY

BACKGROUND OF THE INVENTION

I. Field of the Invention

The present invention relates generally to eyeglasses and, more particularly, to an eyeglass assembly having detachable nosepieces of differing lateral widths and vertical heights in order to accommodate different pupillary distances and pupillary heights for different persons.

II. Description of the Prior Art

The previously known eyeglasses typically comprise a frame having openings adapted to receive both the right and left lenses. A bridge extends laterally across the central portion of the eyeglass frame and supports the eyeglass frame on the nose of the user. In the well known fashion, a pair of stems also attach the eyeglass frame to the ears of the user.

In these previously known eyeglasses, the front of the eyeglass frame is usually molded as a one-piece construction. Consequently, the distance in between the lens openings as well as the vertical position of the lens openings with respect to the bridge are fixed.

As is well known in the art, since the lateral spacing between the lens openings is fixed, it is necessary to accurately trim the eyeglass lenses prior to insertion into the frame. Such trimming ensures that the optical center of the eyeglass lenses is properly matched for the pupillary distance, i.e. the distance between the pupils of the eyeglass wearer as well as the vertical position of the optical center with respect to the nosepiece. Unless the lenses are properly trimmed prior to insertion in the eyeglass frames, the optical centers for the eyeglass lenses will be offset from the pupils of the eyeglass wearer and result in faulty vision correction for the person.

The difficulty of individual fitting and trimming of eyeglass lenses is particularly acute in third world countries. Such third world countries typically lack the financial resources, technical expertise and sheer manpower necessary to individually measure and fit eyeglass lenses to the frames for its population.

SUMMARY OF THE PRESENT INVENTION

The present invention provides an eyeglass assembly capable of using standardized lenses without trimming the lenses and in which the pupillary distance and vertical position can be varied as required by the individual patients.

In brief, the eyeglass assembly of the present invention comprises a left and right frame part which are essentially mirror images of each other. Each frame part, furthermore, includes a circular arc section having a groove adapted to receive a portion of the lens for the eyeglasses.

A nosepiece is also provided for securing the left and right frame parts so that the left and right frame parts are spaced apart from each other but generally coplanar with each other. This nosepiece also includes two circular arc sections each having a groove which is aligned with the grooves in both the left and right frame parts and which also receive a portion of the lens for the eyeglasses. Furthermore, the total arc section of each frame part, together with the corresponding groove in the nosepiece extends through an arc greater than 180°. Consequently, with a circular lens positioned in the groove in both the frame part and the nosepiece, the nosepiece locks the lens in place in the frame part.

A saddle is positioned over the nosepiece which rigidifies the connection between the nosepiece and the frame parts.

Since the nosepiece is detachable from the frame part, different nosepieces having different shapes can be used to vary the lateral spacing between the frame parts as well as the vertical position of the lens openings with respect to the nosepiece. Consequently, the distance between the optical centers of standardized lenses can also be varied in order to accommodate persons with different pupillary distances as well as different vertical positions of their nose bridge with respect to their eyes.

The eyeglass assembly of the present invention can also be used where it is desireable to use a plurality of different lenses with a single eyeglass frame. For example, a plurality of eyeglass lenses having different colors can be used with a common frame for fashion purposes.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is a front plan view illustrating a preferred embodiment of the present invention;

FIG. 2 is a rear view showing the eyeglass assembly with a different nosepiece than shown in FIG. 1;

FIG. 3 is a partial sectional view taken substantially along line 3—3 in FIG. 1;

FIG. 4 is a sectional view taken substantially along line 4—4 in FIG. 1;

FIG. 5 is a fragmentary exploded front view of the preferred embodiment of the invention; and FIG. 6 is a top view taken substantially along line 6—6 in FIG. 1.

DETAILED DESCRIPTION OF A PREFERRED EMBODIMENT OF THE PRESENT INVENTION

With reference first to FIG. 1, a preferred embodiment of the eyeglass assembly 10 of the present invention is thereshown and comprises an eyeglass frame 12 having both a right lens 14 and left lens 16. Both of the lenses 14 and 16 are preferably circular in shape for a reason to be subsequently described.

Still referring to FIG. 1, the eyeglass frame 12 comprises an eyeglass front 18 having a right frame part 20 and a left frame part 22. The frame parts 20 and 22 are essentially mirror images of each other so that only the right frame part 20 will be described in detail it being understood that a like description shall also apply to the other or left frame part 22. In addition, the frame front 18 is adapted to be secured to the ears of an eyeglass wearer by conventional stems or temples 24.

With reference now particularly to FIGS. 1 and 3, the right frame part 20 is adapted for attachment with the right lens 14 and, similarly, the left frame part 22 is adapted for attachment with the left lens 16. To this end, the frame part 20 includes a circular arc edge 26 having a substantially V-shaped groove 28 (FIG. 3) which receives a like shaped edge 30 of the right lens 14. The edge 26, however, preferably extends through an angle or circular arc of less than 180° for a purpose to become shortly apparent.

Referring now to FIGS. 1 and 3-5, a nosepiece 34 is provided for securing the left and right frame parts 20 and 22 together so that the frame parts 20 and 22 are generally coplanar but spaced apart from each other. As best shown in FIG. 4, the nosepiece 34 preferably includes a notch 36 which nests in a like shaped notch 38 (FIG. 5) on the frame part 18. In doing so, one or more holes 40 in the nosepiece 34 register with holes 42 in the frame part 18.

With reference now to FIGS. 4–6, a U-shaped saddle 44 is then positioned over the top of both the nosepiece 34 and the frame parts 20 and 22 thus sandwiching the nosepiece 34 and frame parts 20 and 22 in between the sides 46 of the saddle 44. Holes 48 in the saddle 44 also register with the holes 40 and 42 in the nosepiece 34 and frame part 18 respectively. Screws 50, which are preferably self tapping, are then disposed to the registering holes 40, 42 and 48 so that, upon tightening, the screws 50 firmly secure the nosepiece 34 and frame parts 20 and 22 together.

With reference now particularly to FIGS. 3 and 5, the nosepiece 34 also includes a pair of oppositely facing V-shaped grooves 52 and 54, respectively. Each edge 52 and 54, furthermore, is generally circular in shape and includes a V-shaped groove 56 (FIG. 3) which is aligned with the V-shaped groove 28 on the frame parts 18 and 22, respectively.

The total angular length of the V-shaped groove 28 together with the corresponding groove 56 on the nosepiece 34 exceeds 180° as best shown in FIG. 1. Consequently, with the lens positioned in the V-shaped grooves 28 and 52 and the screws 50 tightened, the nosepiece 34 effectively locks the right lens 14 to the right frame part 20 and the left lens 16 to the left frame part 22.

With reference now to FIGS. 1 and 2, the nosepiece 34 includes two inwardly facing surfaces 60 which are adapted to support the eyeglass assembly 10 on the bridge of the eyeglass wearer. Consequently, by varying the lateral width of the nosepiece 34 between the width 62 (FIG. 1) and 62' (FIG. 2), the pupillary distance between the eyeglass lenses 14 and 16 can be varied as desired. Likewise, the vertical spacing between the bridge at the nose and the optical center of the lenses 14 and 16 can also be varied by changing the shape of the facing edges 60 of the nosepiece 34 so that the frame parts 20 and 22, and thus the lenses 14 and 16, are at different vertical positions with respect to the eyeglass wearer's nose in order to accommodate different users.

The ability to vary the pupillary distance as well as the vertical position of the lenses 14 and 16 when the eyeglasses are worn is advantageous in several different respects. First, a standard lens can be adapted to accommodate different users with different pupillary distances and vertical spacing by simply changing the nosepiece 34 to a different type of nosepiece. This is particularly advantageous in third world countries since a single lens can be used for many different types of users without the necessity of trimming the lens or otherwise fitting the lens to the glass frame.

As best shown in FIG. 2, in order to properly align the lenses 14 and 16 to the eyeglass frames 20 and 22 to correct for cylinder correction (astigmatism), the posterior side of the lens parts 20 and 22 preferably include a scale 66 which is used in conjunction with a mark 68 on the lens itself. The circular position of the lens is then adjusted prior to tightening the screws 50.

It should be noted that, while the simple correction using the scale 66 and mark 68 cannot be used to correct a bifocal lens with cylinder correction since it is not possible to simultaneously align the cylinder and set the pupillary distance, it can be used to accommodate a single vision lens with a plus or minus cylinder as well as a bifocal lens with no cylinder. That, however, constitutes approximately 75% of all eyeglass wearers while the remaining 25%, if necessary, can maintain two pairs of glasses, one for reading and one for distance vision.

A still further advantage of utilizing a single frame with standard lenses 14 and 16 is that different lenses, for example different colors of sunglass lenses, can be easily and rapidly mounted to the frame assembly as desired. This would be particularly advantageous for fashion eyeglasses.

Having described my invention, however, many modifications thereto will become apparent to those skilled in the art to which it pertains without deviation from the spirit of the invention as defined by the scope of the appended claims.

I claim:

1. An eyeglass assembly comprising
    a left frame part,
    a right frame part,
    a left lens,
    a right lens,
    wherein said left and right lenses are detachably secured to said left and right frame parts, respectively,
    means for joining said left and right frame parts in a side by side relationship and for simultaneously securing said left and right lens to said left and right frame parts, respectively, comprising a nosepiece adapted to rest on the bridge of a nose, said right and left frame parts being detachably secured to said nosepiece so that said left and right lenses may be removed from said eyeglass assembly and replaced with different right and left lenses,
    wherein each frame part includes an arcuate edge having a groove adapted to receive an edge of its corresponding left or right lens, said frame part groove extending through an arc of less than 180 degrees, and wherein said nosepiece comprises two oppositely facing edges, each nosepiece edge having an arcuate groove adapted to receive a portion of the edge of its respective left or right lens,
    wherein the arcuate groove of each nosepiece edge registers with its respective frame part groove and forms a combined arcuate groove of greater than 180 degrees.

2. The invention as defined in claim 1 wherein at least one lens has a cylindrical correction and a mark adjacent the periphery of said one lens, and comprising a scale on each frame part for use in conjunction with said mark on said one lens.

3. The invention as defined in claim 1 and comprising at least two nosepieces, said nosepieces each having a different lateral width.

4. The invention as defined in claim 1 wherein said joining means comprises a saddle positioned over said nosepiece.

5. The invention as defined in claim 1 wherein each lens is circular in shape.

* * * * *